United States Patent [19]
Hager et al.

[11] Patent Number: 5,689,601
[45] Date of Patent: Nov. 18, 1997

[54] WATER BLOCKING OPTICAL CABLE REINFORCEMENT

[75] Inventors: Thomas P. Hager, Westerville; David L. Molnar, Newark; Diane M. Hulett, Glenford, all of Ohio

[73] Assignee: Owens-Corning Fiberglas Technology Inc., Summit, Ill.

[21] Appl. No.: 519,038

[22] Filed: Aug. 24, 1995

[51] Int. Cl.⁶ .................................................. G02B 6/44
[52] U.S. Cl. .................. 385/100; 385/122; 385/128; 65/443; 524/494
[58] Field of Search .................. 385/100–114, 122–128; 65/448, 434, 443; 524/494

[56] References Cited

U.S. PATENT DOCUMENTS

| | | | |
|---|---|---|---|
| 4,157,326 | 6/1979 | Baer | 524/494 |
| 4,718,747 | 1/1988 | Bianchi et al. | 350/96.23 |
| 4,795,234 | 1/1989 | Nakasone et al. | 385/100 X |
| 4,812,014 | 3/1989 | Sawano et al. | 350/96.29 |
| 4,895,426 | 1/1990 | Pinson | 385/100 X |
| 5,039,197 | 8/1991 | Rawlyk | 385/102 |
| 5,057,338 | 10/1991 | Baucom et al. | 427/185 |
| 5,102,690 | 4/1992 | Iyer et al. | 427/57 |
| 5,123,373 | 6/1992 | Iyer et al. | 118/612 |
| 5,128,199 | 7/1992 | Iyer et al. | 428/240 |
| 5,157,752 | 10/1992 | Greveling et al. | 385/112 |
| 5,182,784 | 1/1993 | Hager et al. | 385/128 |
| 5,188,883 | 2/1993 | Rawlyk | 385/107 X |
| 5,302,419 | 4/1994 | Muzzy | 427/485 |
| 5,310,582 | 5/1994 | Vyakarnam et al. | 427/560 |
| 5,370,911 | 12/1994 | Throne et al. | 427/469 |

OTHER PUBLICATIONS

Grabandt et al., "On the Development of a Twaron® Aramid Yarn with Water–Blocking Properties," Akzo, 41st Int'l Wire and Cable Symposium, Nov. 16–19, 1992, Reno, Nevada, USA.

"Twaron as Linear Strength Member," Akzo, 1992, The Netherlands.

*Primary Examiner*—Phan T. H. Palmer
*Attorney, Agent, or Firm*—C. Michael Gegenheimer; Inger H. Eckert

[57] ABSTRACT

An optical cable reinforcement in the form of glass fiber strands [30] having a first coating [32] of a binding agent such as a latex mixture and a second coating [34] of particles [36] of a water blocking agent such as a polyacrylate salt. The particles [36] of water blocking agent are adhered to the glass fiber strands [30] by the binding agent without the binding agent entirely coating the particles of water blocking agent. The unoccluded surface areas of water blocking agent thus provided serve to rapidly absorb/desorb water and protect the optical cable from moisture. A unique powder coating station [60] is used to apply the particles [36] of water blocking agent to glass fiber strands [30] which have been coated with wet binding agent so that the proper adherence of the particles [36] of water blocking agent without complete embodiment, is obtained.

20 Claims, 3 Drawing Sheets

WATER BLOCKING OPTICAL CABLE REINFORCEMENT

TECHNICAL FIELD

The present invention relates to an optical cable reinforcement containing a water blocking agent and, more particularly, it relates to a glass fiber reinforcing material of glass fiber strands which have been coated with a binding agent and, then, coated with a water blocking agent and the method of making that glass fiber reinforcing material.

BACKGROUND ART

As is well known, moisture is a major problem for optical cables. Three relatively distinct techniques have been suggested to prevent or restrict migration of moisture along cable passageways.

In one of these techniques, water repellant materials are included in the cable structures. These water repellant materials normally include hydrophobic greases or gels which are caused to fill cable passageways containing the fibers. There are problems associated with the use of greases or gels. For instance, such materials are difficult and costly to apply into and fill cable passageways, the filling operation necessarily taking place as parts of the cable which define the passageways are being formed. In more practical terms, tubes are made for enclosing the fibers, the tubes being extruded around the fibers as the fibers are guided through an extruder head together with the grease or gel which is applied into the tube under pressure. Grease or gel also makes it difficult and unpleasant to handle the fibers during installation or repair of a cable, and at low temperatures (e.g. below 0° C.) change in viscosity of the grease or gel surrounding and contacting fibers may increase signal attenuation in the fibers. A further problem is that because greases or gels may be incompatible with economically desirable plastics which could normally be extruded as tubes for containing the fibers, more expensively engineered polymers may be required for the tubes.

In another technique for preventing or restricting migration of moisture along the cable passageways, it has been suggested that the passageways should purposely remain unobstructed and pressurized gas (i.e. air) is pumped into the passageways to maintain a moisture-free environment. Thus, pressurized air is caused to flow along grooves formed in a central plastics member of the cable so that the pressurized air can reach into spaces between tubes which surround the plastics member, each of the tubes containing optical fibers. With such an arrangement air flow detectors would be provided to sense a change in air flow rate, upon an escape of air through a damaged region in the outer elements of the cable, so as to trigger an alarm thereby signalling a need for cable repair.

While this second technique provides a means for detecting cable damage, it does not provide a method for containing or preventing worsening of the damage. Hence, before repair can commence after the alarm signal, water may have entered the cable and has flowed freely in both directions from the originally damaged region. This flow does, of course, increase the length of damage along the cable and necessarily increases the cost of repair since the section of cable containing water will need to be replaced.

Finally, there is a technique of wrapping the optical cable in a tape which may be a composite tape structure having a metal tape layer and a layer of a water blocking agent as disclosed in Rawlyk U.S. Pat. No. 5,039,197. Alternatively, as disclosed in Greveling U.S. Pat. No. 5,157,752 the water blocking material may be of filamentary structure, e.g. string or tape which acts as a carrier for the powdered water blocking agent, which extends along the optical cable passageway, rather than being wrapped around the optical cable. Aramid fibers with a water-blocking capability, by reason of application of a water-in-oil emulsion of a super-absorbing polymer on the aramid fibers, have been proposed for the same purpose.

However, as stated in Rawlyk U.S. Pat. No. 5,188,883: "In the manufacture of . . . [a] tape structure, because the water blocking material has substantially no rigidity, a binder tape needs to be wrapped around the tape layer of water blocking material immediately after it has been applied around the core so as to hold it in position before the wrapping of the shield around the water blocking material. Hence, the use of a tape layer of water swellable blocking material has necessarily included extra processes and apparatus for the application of the binder together with attendant additional costs." One of the solutions to that problem mentioned in Rawlyk U.S. Pat. No. 5,188,883 is to use a particulate water blocking agent (sodium polyacrylate) in an adhesive layer or a softened polymer layer. Thus, it is disclosed that a metal tape is provided with an adhesive before passing beneath a powder applicator to bond the particles to one surface of the metal tape. Alternatively, it is stated that the adhesive applicator can be replaced by a heater for softening an ethylene acrylic layer on one side of the metal tape so that the particles of sodium polyacrylate adhere to the softened layer.

While that solution to the problem is effective in adding rigidity and permanency to the water blocking material, it also tends to decrease somewhat the water absorbing ability of the powdered water blocking agent material because that powder is at least partially encapsulated by the adhesive layer or softened polymer. Besides, metal tape reinforcing structures of the type used in Rawlyk U.S. Pat. No. 5,188,883 do not offer the advantages of a glass fiber reinforcing material, for example.

Accordingly, the need exists for an improved optical cable reinforcement having a water blocking agent which is permanently affixed to the reinforcing material without decreasing the water absorbing ability of that water blocking agent and having advantages over other types of reinforcing structures.

DISCLOSURE OF INVENTION

That need is met by the present invention which provides an optical cable reinforcement in the form of a glass fiber reinforcing material of glass fiber strands which have thereon a first coating of a binding agent and a second coating of particles of water blocking agent. The particles of water blocking agent are adhered to the glass fiber strands by the binding agent without the binding agent entirely coating the particles of water blocking agent. That assures that unoccluded surface areas of water blocking agent are available to rapidly absorb water and serves to protect the optical cable from damage due to moisture. Likewise, the unoccluded surface areas of water blocking agent permit rapid desorption of water, so that the water blocking agent rapidly renews itself upon drying.

The binding agent is preferably selected from the group consisting of latex polymers, such as acrylic latex polymers, latex copolymers, such as styrene-butadiene copolymer latex, and mixtures thereof. Most preferably the binding agent further includes a paraffin wax emulsion. One or more lengths of glass strands, which may be in the dozens, are preferably coated with the binding agent by passing each glass fiber strand through a bath of liquid binding agent. That strand is then passed through a stripping die to assure that relatively uniformly thick coating of binding agent is applied to the glass fiber strand. The amount of binding agent applied is 2 to 20% by dry weight of the glass fiber strand. In addition to the latex bath, a dilute latex spray may be used both before and after the glass fiber strands are coated with particulate water blocking agent. That assures that there is enough binding agent to firmly adhere the particles of water blocking agent to the glass fiber strand and yet not enough to completely embed the particles of water blocking agent in the binding agent and thus not entirely coat the particles of water blocking agent with binding agent. In addition to the presence of large amounts of unoccluded water blocking agent surface area, another key feature of the present invention is the firm adherence of the particles of water blocking agent to the glass fiber strands. The use of the preferred binding agent in the specified amounts, and otherwise practicing the preferred method as further described below enables that result.

The particles of water blocking agent are preferably polyacrylate salt, such as sodium polyacrylate or potassium polyacrylate, particles. The desired average particle size is less than 250 microns and preferably 1 to 150 microns.

After the lengths of glass fiber strands have been coated with the binding agent, and while the binding agent is still wet, each glass fiber strand is passed through one or two powder coating stations where the particles of water blocking agent are applied. Preferably the powder coating stations provide both a fluidized bed of particles of water blocking agent and a spray of particles of water blocking agent. In that manner, it is possible to apply 0.1 to 10% by weight of particles of water blocking agent.

The lengths of glass fiber strands are then passed through an oven which heats the glass fiber strand to approximately 450° F. (232° C.) so as to dry and cure the binding agent. That firmly adheres the particles of water blocking agent to the glass fiber strand in the manner described above.

Thereafter, each length of glass fiber strand may be wound on a roll for shipment to the optical cable manufacturer for use as a glass fiber reinforcing material. The optical cable manufacture may use the glass fiber reinforcing material by helically wrapping the glass fiber strands around the optical cable core. In that manner the glass fiber reinforcing material acts as both a tensile strength member and a compressive modulus member. In addition, of course, it acts as a water blocking material to protect the optical cable from moisture. Alternatively, the optical cable manufacture might use the glass fiber reinforcing material by braiding the glass fiber strands and then wrapping the braided material around the optical cable core in the manner of the tapes which have been previously used as a water blocking wrap.

In either event, an improved optical cable reinforcement is provided. Accordingly, it is an object of the present invention to provide an improved optical cable reinforcement containing a water blocking agent and a unique method of making that optical cable reinforcement. These, and other objects and advantages of the present invention, will become apparent from the following detailed description and the accompanying claims.

MODES FOR CARRYING OUT THE INVENTION

Figure 1:
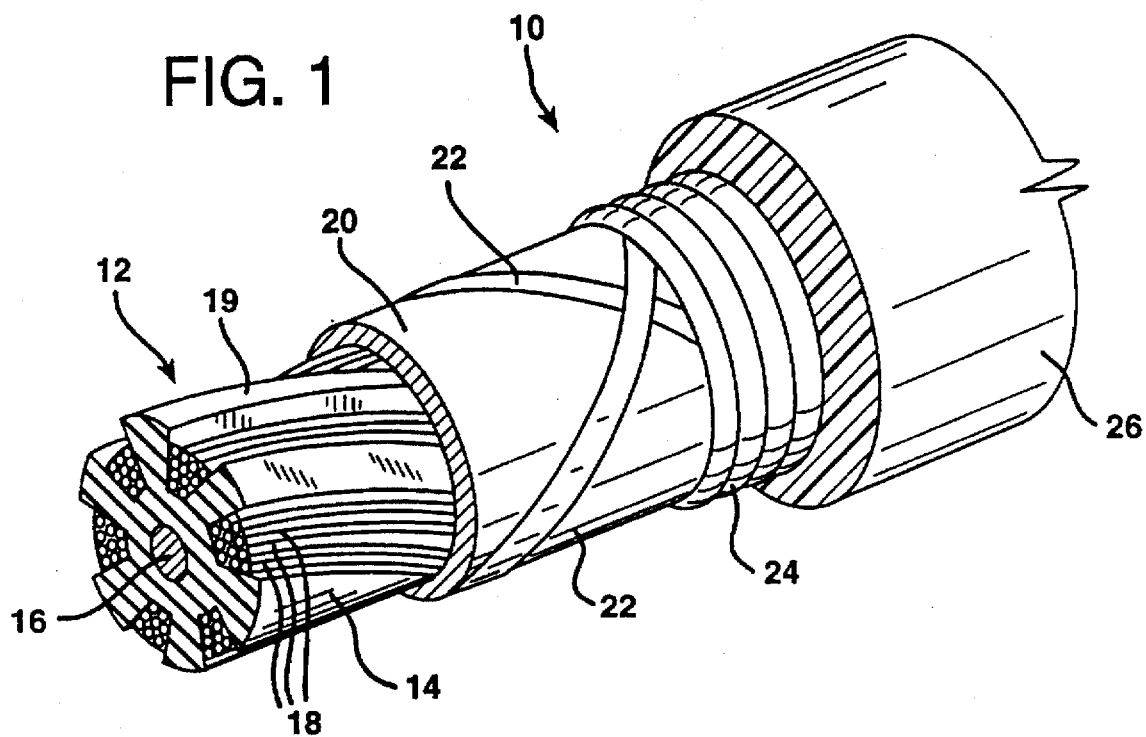
FIG. 1 is an isometric view of part of a sectional optical cable utilizing the glass fiber reinforcing material of the present invention as an optical cable reinforcement.

Referring to the drawings, FIG. 1 shows an optical cable 10 having a core 12 composed of elongate plastic extruded core member 14, a longitudinal extending tensile reinforcing means which may be a central strength member 16, and transmission elements 19 housed in helically extending grooves formed around the outside of the core member 14. These transmission elements are either groups of optical fibers directly inserted into the grooves or alternatively comprise flexible plastic tubes held within the grooves, the plastic tubes containing groups of optical fibers. Glass fiber reinforcing material 18 of glass fiber strands are helically wrapped around the core member 14 along with the transmission elements 19. Surrounding the core is a binding layer 20 with binding tapes 22 affixed thereto. This binding layer 20 is surrounded by a corrugated metal shield 24. Immediately surrounding the metal shield is an extruded polymeric jacket 26 such as a polyethylene jacket.

Figure 2:
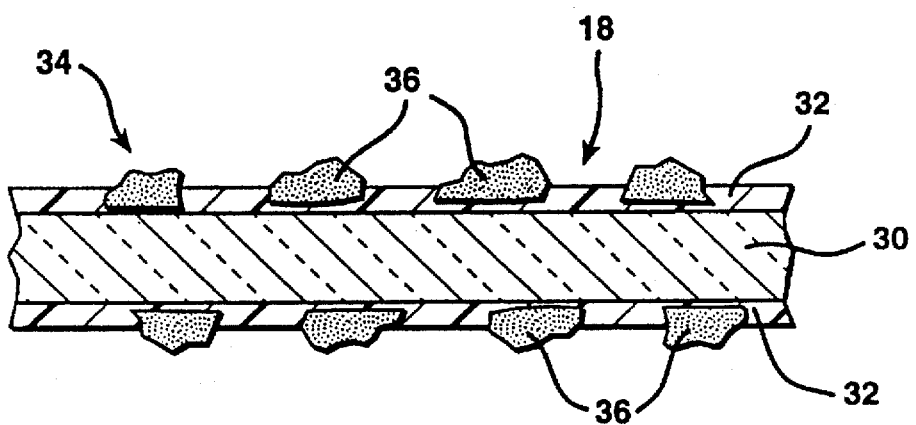
FIG. 2 is a cross-sectional view along the length of the glass fiber reinforcing material of the present invention.

As can be better seen in FIG. 2, glass fiber reinforcing material 18 is made up of glass fiber strands 30 which have thereon a first coating 32 of a binding agent and a second coating 34 of particles 36 of water blocking agent. As shown, the particles 36 are adhered to the glass fiber strand 30 by the binding agent without the binding agent entirely coating the particles 36 of water blocking agent. As mentioned previously this leaves unoccluded surface areas of water blocking agent available to rapidly absorb/desorb water.

The preferred binding agent used to form first coating 32 has as its latex solids component a mixture of approximately 24% styrene-butadiene copolymer latex such as Dow Latex DL 216NA1 from Dow Chemical Co., Midland, Mich., approximately 71% acrylic latex such as Rhoplex E-32 from Rohm & Haas Co., Philadelphia, Pa., and approximately 5% paraffin wax emulsion such as Velvitol 77-70 from Rhone Poulenc Inc., Research Triangle Park, N.C. That latex solids mixture is added to deionized water (38% solids mixture, 62% water) to form the latex coating of binding agent. The preferred particles 36 of water blocking agent to form second coating 34 are either sodium polyacrylate particles such as Cabloc 800HS from Stockhausen, Greensboro, N.C., or potassium polyacrylate particles such as Aridall 1460F from Chemdal, Palantine, Ill.

Figure 3:
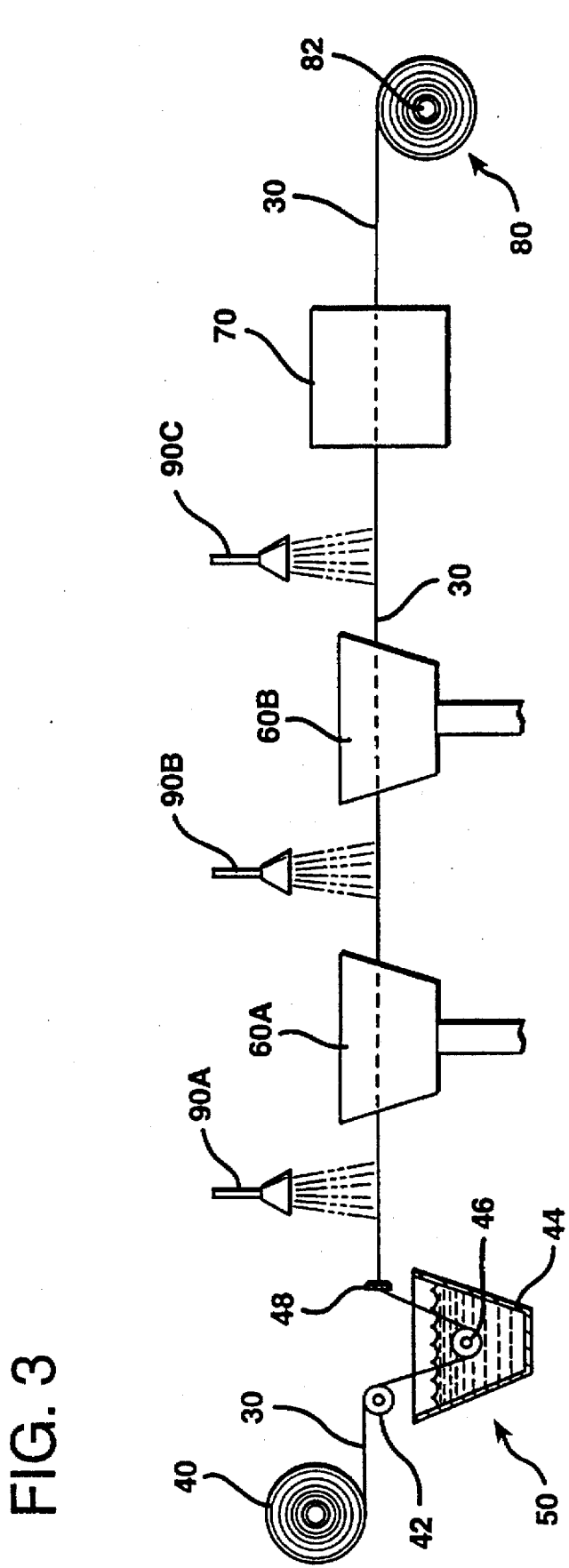
FIG. 3 is a diagrammatic side elevational view of the apparatus for making the glass fiber reinforcing material of the present invention.

Referring to FIG. 3, a length of glass fiber strand 30 is provided from a source 40, which may be an extruder or a reel, if the glass fiber strand has already been extruded and wound on a reel as shown. Glass fiber strand 30 is preferably 1 to 2.5 mm in diameter. Glass fiber strand 30 is then moved through a coating station 50 for application of the first coating 32. Preferably that is done by passing the length of glass fiber strand 30 over roller 42, into bath 44, beneath roller 46, and through stripping die 48 which preferably has a 44 mil (1118 microns) opening. The liquid binding agent is maintained in bath 44 at room temperature. A combination of speed of travel of the length of fiber glass strand 30, which is preferably 50 to 300 ft./min (15–91 meters/min), and use of stripper die 48 assures that 5 to 30% wet binding agent is applied to the glass fiber strand, which when considered with the subsequent latex spray applications and, when, then, dried and cured, gives a desired dry weight percent of 2–20% of binding agent on the glass fiber strand.

Thereafter, latex sprayer 90A having external mix nozzles with a 0.020 (0.05 cm) inch opening is used to apply a 5% solids mix of acrylic latex such as Rhoplex E32 and deionized water at a spray rate of 80 grams/minute and an air pressure of 25 psi (1758 grams/sq. cm.). This provides for a wetter glass fiber strand 30 and better powder deposition in the first powder coating station 60A.

Figure 4:
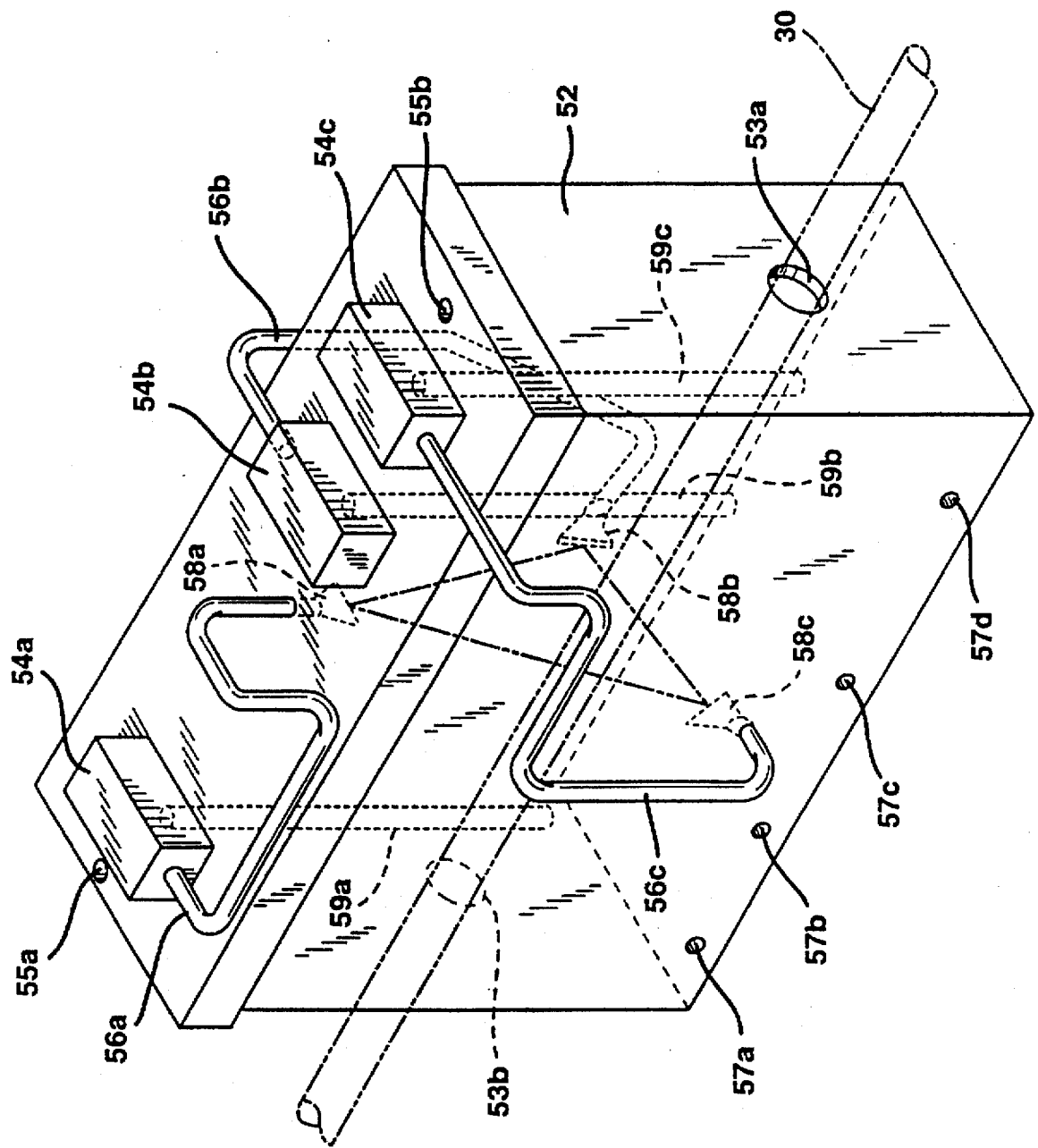
FIG. 4 is a perspective side view of the powder coating station used in the method of making the glass fiber reinforcing material of the present invention.

Thus, the length of glass fiber strand 30 having wet binding agent coated thereon is then passed through powder coating stations 60A and 60B. Powder coating stations 60A and 60B are better shown in FIG. 4. As shown, they have a chamber 52 approximately 6 inches (15.24 cm) wide, 28 inches (71.12 cm) long, and 18 inches (45.72 cm) deep which is designed to handle a single length glass strand 30 by mason of approximately 2 inch (5.08 cm) diameter entrance hole 53A and exit hole 53B each with a gate therein (not shown) in the ends thereof. If multiple lengths of glass fiber strands 30 are being coated, a wider chamber 52, having multiple entrance and exit holes therein would be needed. But, it is to be understood that one or more, up to dozens, such as six dozen (72) glass fiber strands, may be coated by this method. Powder coating stations 60A and 60B also have pump blocks 54a, 54b and 54c and pump hoses 56a, 56b and 56c and spray nozzles 58a, 58b and 58c, fed by robes 59a, 59b, and 59c, all of which operates to spray particles 36 of water blocking agent onto glass fiber strand 30 (which is greatly exaggerated in size in FIG. 4 for illustration purposes only) at 30 psi (2109 grams/sq. cm.). In addition to the air sprays, particles 36 are fluidized in chamber 52 by mason of drawing a vacuum through vacuum ports 55a and 55b and providing inlet air ports 57a, 57b, 57c and 57d to fluidize the bed at about 20 psi (1406 grams/sq. cm.). That fluidizes the bed of particles 36 in chamber 52 through which the length of glass fiber strand 30 passes. The net result is application of 0.1 to 10% of the second coating 34 of water blocking agent.

For efficient powder application, a small particle size, preferably less than 250 microns, and most preferably 1 to 150 microns, is desired. Larger particles are difficult to make into a uniform aerosol.

Next latex sprayer 90B, which is similar to latex sprayer 90A, is used to apply another 5% solids mix of acrylic latex and water, this time at 12 psi (844 grams/sq. cm.) so as not to blow particles 36 off of glass fiber strand 30. This is a light sealer coat in one instance and a wetter coat in the other instance, i.e., with regard to powder coating station 60B which operates in the same manner as powder coating station 60A. Then, finally, latex sprayer 90C, which is similar to latex sprayers 90A and 90B, is used to apply a 10% solids mix of acrylic latex at 25 psi (1758 grams/sq. cm.) in order to hold particles 36 on glass fiber strand 30 through oven 70 and, then, during custom processing.

Next, the length of glass fiber strand 30 having first coating 32 and second coating 34 thereon is passed through oven 70, which may be a three zone oven, where it is heated to approximately 450° F. (232° C.) to dry and cure the binding agent of first coating 32. Thereafter, glass fiber strand 30 may be wound on a cardboard tube 82 at winder 80 such as a Lessona Winder operating at 50 feet per minute (15 meters/minute). That square-edged package of glass fiber reinforcing material is then supplied to the optical cable manufacturer for use as an optical cable reinforcement.

The result is a glass fiber reinforcing material having the characteristics set forth in Table I below:

TABLE I

|  | Set I n = 7 | Set II n = 26 | Set III n = 26 | Set IV n = 9 | Mean of Sets I–IV | n = |
|---|---|---|---|---|---|---|
| Average LOI(1) | 14.60% | 15.94% | 17.20% | 15.30% | 15.80% | 4 |
| Average % Wt. gain: 1 Min(2) | 178.60% | N/A | N/A | 196% | 187.30% | 2 |
| Average % Wt. gain: 5 Min(2) | 259.60% | N/A | N/A | 280% | 269.80% | 2 |
| Average % Wt. gain: 1 Hour(2) | 289.30% | N/A | N/A | 328% | 308.60% | 2 |
| Average % Diameter Increase (3) | 107.43% | N/A | N/A | 75% | 91.20% | 2 |

(1) LOI: Loss on Ignition - Sample is weighed, burned out at 1200F and reweighed.
(2) Wt. gain - Sample is weighed, then soaked in deionized water for 1, 5 and 60 minutes and weighed at intervals.
(3) Diameter increase - Sample is measured before soaking for 1 minute and measured after soaking.

As shown in FIG. 1, one form of optical cable reinforcement is to use the glass fiber reinforcing material 18 as a helical wrap with optical fibers 19 around the optical cable core 14. In that form the glass fiber reinforcing material has four features: 1) Tensile Member—carrying the tensile load of the optical cable during installation, 2) Compressive Modulus Member—supplying the cable with longitudinal compressive modulus to offset the shrinking forces of the polyethylene jacket during cold temperature cycling, 3) Water Blocking—offering a "dry" cable, that is, a cable that passes the Bellcore Water Penetration Test without the use of liquid, hydrophobic greases, and 4) Immobile Water Blocking Powder—immobilizing the particles of water blocking agent inside the cable (loose particles can dribble out of a cable and, as when two cables are being spliced in the field—those loose particles when mixed with water become hydrogels and produce a very slippery and hazardous working environment).

Alternate forms of use for the glass fiber reinforcing material include braiding it into a braided web/tape for wrapping around the optical cable core as a water blocking tape layer, or running it longitudinally down the cable as in U.S. Pat. No. 5,157,752. Other applications may occur to those skilled in the art.

While certain representative embodiments and details have been shown for purposes of illustrating the invention, it will be apparent to those skilled in the art that various changes in the product disclosed herein may be made without departing from the scope of the invention, which is defined in the appended claims.

We claim:

1. An optical cable comprising:
   an optical cable core;
   optical fibers around the optical cable core; and
   a glass fiber reinforcing material wrapped around the optical cable core and comprising glass fiber strands having thereon a first coating containing a binding agent and a second coating containing particles of a water blocking agent adhered to said glass fiber strands by said binding agent without said binding agent entirely coating said particles, wherein said binding agent contains a member selected from the group consisting of latex polymers, latex copolymers, and mixtures thereof.

2. An optical cable reinforcement comprising a glass fiber reinforcing material of glass fiber strands having thereon a first coating containing a binding agent including a member selected from the group consisting of latex polymers, latex copolymers, and mixtures thereof, and a second coating containing particles of a water blocking agent adhered to said glass fiber strands by said binding agent without said binding agent entirely coating said particles.

3. The optical cable reinforcement of claim 2 wherein said binding agent member is a mixture of a styrene-butadiene copolymer latex and an acrylic latex.

4. The optical cable reinforcement of claim 3 wherein said binding agent further includes a paraffin wax emulsion.

5. The optical cable reinforcement of claim 2 wherein said particles of water blocking agent are polyacrylate salt particles.

6. The optical cable reinforcement of claim 5 wherein said polyacrylate salt is sodium polyacrylate.

7. The optical cable reinforcement of claim 5 wherein said particles of water blocking agent have an average particle size of less than 250 microns.

8. The optical cable reinforcement of claim 2 wherein said binding agent member is a mixture of a styrene-butadiene copolymer latex and an acrylic latex and said binding agent further includes a paraffin wax emulsion, and said particles of water blocking agent are polyacrylate salt particles having an average particle size of less than 250 microns.

9. The optical cable reinforcement of claim 2 wherein said first coating is present in an amount of from 2 to 20 percent by dry weight based on the weight of the glass fiber strands, and said second coating is present in an amount of from 0.1 to 10 percent by dry weight based on the weight of the glass fiber strands.

10. The optical cable reinforcement of claim 2 wherein said glass fiber reinforcing material is in a form capable of acting both as tensile strength member and as a compressive modulus member in an optical cable.

11. The optical cable reinforcement of claim 2 wherein said glass fiber strands are braided to form a glass fiber reinforcing material which may be wrapped around an optical cable core.

12. A method of making an optical cable reinforcement comprising:

moving at least one length of glass fiber strand through a liquid coating station that coats said length with a first coating containing a binding agent in liquid form to form a wet coated glass fiber strand;

passing the wet coated glass fiber strand through a powder coating station that adheres particles of a water blocking agent to the wet coated glass fiber strand forming a coated glass fiber strand having thereon the first coating containing the binding agent and a second coating containing the particles, wherein the particles adhere without the binding agent entirely coating the particles; and drying and curing the coated glass fiber strand to form a coated length of glass fiber strand.

13. The method of claim 12 further comprising:

winding said coated length of glass fiber strand onto a tube.

14. The method of claim 13 wherein said liquid coating station comprises a bath of the coating agent in liquid form.

15. The method of claim 14 further comprising:

passing the wet coated glass fiber strand through a stripping die after the bath.

16. The method of claim 12 wherein said powder coating station comprises a fluidized bed of said particles and a spray of said particles.

17. The method of claim 16 wherein said particles of water blocking agent have an average particle size of less than 250 microns.

18. The method of claim 17 wherein said particles of water blocking agent are polyacrylate salt particles.

19. The method of claim 12 wherein said binding agent contains a member selected from the group consisting of latex polymers, latex copolymers, and mixtures thereof.

20. The method of claim 12 wherein said binding agent is present in an amount of from 5 to 30 percent by dry weight based on the weight of the glass fiber strand, and said particles are present in an amount of from 0.1 to 10 percent by dry weight based on the weight of the glass fiber strand.

* * * * *